(No Model.)
C. H. KEENEY.
DEVICE FOR PREVENTING WATER FROM FREEZING IN PIPES.
No. 503,932.          Patented Aug. 22, 1893.
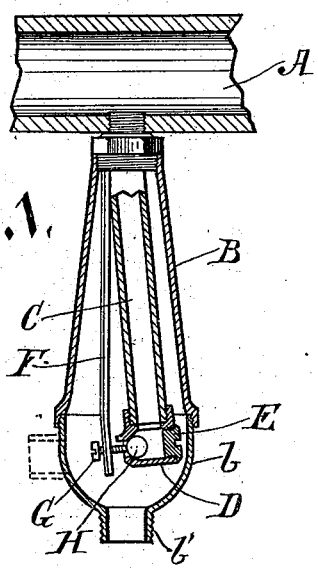
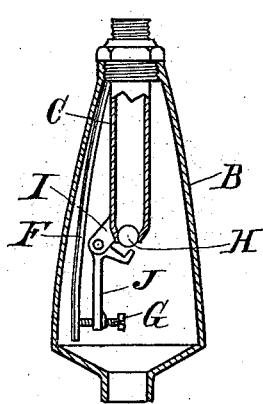
Witnesses.
Anna V. Faust
Arthur L. Morsell
Inventor.
Charles H. Keeney
By C. T. Benedict
Attorney.

UNITED STATES PATENT OFFICE.

CHARLES H. KEENEY, OF MILWAUKEE, WISCONSIN.

DEVICE FOR PREVENTING WATER FROM FREEZING IN PIPES.

SPECIFICATION forming part of Letters Patent No. 503,932, dated August 22, 1893.

Application filed October 19, 1891. Serial No. 409,104. (No model.)

*To all whom it may concern:*

Be it known that I, CHARLES H. KEENEY, of Milwaukee, in the county of Milwaukee and State of Wisconsin, have invented a new and useful Improvement in Devices for Preventing Water from Freezing in Pipes, of which the following is a description, reference being had to the accompanying drawings, which are a part of this specification.

My invention has relation to improvements in devices for preventing water from freezing in pipes.

The object had in view is the application of the thermostatic principle for accomplishing the above purpose.

The invention consists in the improved construction hereinafter more fully set forth.

In the accompanying drawings, Figure 1, is a sectional view showing one form of my device in its application to an ordinary water pipe, and Fig. 2, is a similar view showing another form thereof, and omitting the pipe.

Like letters of reference refer to like parts throughout the several views.

Referring to the drawings the letter A indicates an ordinary water pipe, provided with a screw threaded aperture, and B a casing, which, in Fig. 1, is shown as provided with a screw threaded removable bottom, b, to provide for ready access to the parts therein for the purpose of adjusting or removing the same. The upper end of this casing is screw threaded to fit the threaded aperture of the pipe, and, is provided with an interior depending pipe C.

Referring, now, to Fig. 1 the above referred to pipe C, is threaded at its lower end, and receives a threaded upper portion of a valve casing, D, one of the ends of said casing having a valve opening and seat therein, and the opposite open end receiving a screw plug, E, which enables access to be had to the valve. The thermostat F is composed of inner and outer strips of soft and hard metal respectively, and is provided at its lower end with an adjusting screw G, the free end of which is adapted to bear against valve H. It will be noticed that, in Fig. 1, the pipe C is arranged at a slight obliquity, which is done for the purpose of securing greater compactness, and to provide for sufficient lateral movement of the thermostat, without the necessity of increasing the width of the casing. The valve casing, D, is also adjusted to the end of the pipe at an incline, whereby the ball-valve, by gravity, is kept against its seat.

In Fig. 2, the valve-seat is formed as a part of pipe C, which latter is also provided with an inclined arm I. To this arm is pivoted a bell-crank lever J, the longer member of which receives the adjusting screw, G, which is adapted to bear against the lower end of the thermostat. As the water flows through pipe A, shown in Fig. 1, it passes down into pipe C, and should the temperature reach about the freezing point, the soft metal of the thermostat will contact, and cause said thermostat to move laterally toward the valve casing. With this movement screw G bears against the valve, and unseating the same will cause a free flow of water, thus effectually preventing freezing. This flow will continue until the temperature becomes sufficiently raised to expand the soft metal, which will have the effect of causing the free end of the thermostat to move laterally away from the valve casing, thus permitting the valve to automatically seat itself.

In Fig. 2, instead of the thermostat acting directly upon the valve, it does so through the intervention of the bell-crank J. The screw G, is, of course, so adjusted that said screw or the bell crank lever, as the case may be, will operate the valve when the temperature reaches a desired point. The purpose of employing this bell crank lever is to increase the leverage, in case it is found that the thermostat does not possess sufficient power. I have also shown in Fig. 1 the lower tubular end, b', of the removable bottom threaded. To this threaded end may be coupled a connecting pipe, for conducting or removing the water contained within the casing. I have also shown in dotted lines in said figure this tubular portion in a different position, so as to provide for the free outflow of the water when the casing is coupled to a pipe running at right angles to the pipe A. It will be noticed that the valve illustrated is a freely moving gravity valve, normally held against its seat by the pressure of the water above the same, and that the thermostat has no direct connection therewith, and merely acts to open the same against the pressure of the water when contracted by the cold. This form is advantageous, inasmuch as should there be a direct connection between the thermostat and the valve, the former, when subjected to heat, or during hot weather, would expand and draw the valve forcibly against its seat, thereby severely straining the parts, and rendering them liable to breakage and damage.

Having thus described my invention, what I claim, and desire to secure by Letters Patent of the United States, is—

1. In a device for preventing water from freezing in pipes, the combination, of a pipe having a valve opening therein, a valve closing said opening, a thermostat, and an adjusting screw unconnected with the valve and communicating by contact between the thermostat and the valve and operated by the thermostat to cause the opening of said valve, substantially as set forth.

2. In a device for preventing the water from freezing in pipes, the combination, of a pipe having a valve opening therein, a loose valve arranged to close in the direction of the flow and by the pressure of the water, and a thermostat, the free end of which is unconnected with the valve and is constructed to force said valve away from its seat when the temperature reaches a certain point and to allow the same to automatically seat itself upon the temperature rising above said certain point, substantially as set forth.

3. In a device for preventing water from freezing in pipes, the combination, of a pipe having a valve opening therein, a loose stemless valve so arranged with respect to the pipe as to close automatically in the direction of the flow and by the pressure of the water therein, a pivoted bell-crank lever normally out of contact with the valve, a thermostat constructed so as by its contraction to push one arm of the bell-crank in the direction of its movement and cause the other arm thereof to contact with and force the valve away from its seat, said valve, when the pressure of the bell-crank lever is removed, automatically closing in the direction of the flow and by the pressure of the water in the pipe, substantially as set forth.

In testimony whereof I affix my signature in presence of two witnesses.

CHARLES H. KEENEY.

Witnesses:
C. T. BENEDICT,
ARTHUR L. MORSELL.